United States Patent
Shi

[19]

[11] Patent Number: 6,101,106
[45] Date of Patent: Aug. 8, 2000

[54] PULSE WIDTH MODULATED CONTROLLER FOR HIGH TEMPERATURE POWER CONVERSION

[75] Inventor: Fong Shi, Bellevue, Wash.

[73] Assignee: The Boeing Company, Seattle, Wash.

[21] Appl. No.: 09/245,280

[22] Filed: Feb. 5, 1999

[51] Int. Cl.[7] .......................... H02M 1/14; H02M 3/335; G05F 1/40

[52] U.S. Cl. ............................... 363/41; 363/17; 363/21; 323/282; 323/284

[58] Field of Search .................................. 363/41, 17, 95, 363/46, 25, 49, 56, 21; 323/282, 283, 312, 907, 222, 284, 288; 307/262, 269, 265; 327/538, 513

[56] References Cited

U.S. PATENT DOCUMENTS

| | | | |
|---|---|---|---|
| 4,439,821 | 3/1984 | Grippe | 363/26 |
| 4,586,118 | 4/1986 | Mihalka | 363/17 |
| 4,733,104 | 3/1988 | Steigerwald et al. | 307/26 |
| 5,355,301 | 10/1994 | Saito et al. | 363/147 |
| 5,384,691 | 1/1995 | Neugebauer et al. | 361/794 |
| 5,608,617 | 3/1997 | Morrison et al. | 363/147 |
| 5,682,303 | 10/1997 | Goad | 363/71 |
| 5,703,473 | 12/1997 | Phillips et al. | 323/282 |
| 5,859,560 | 1/1999 | Matthews | 327/513 |
| 5,943,227 | 8/1999 | Bryson et al. | 363/95 |

*Primary Examiner*—Shawn Riley
*Assistant Examiner*—Rajnikant B. Patel

*Attorney, Agent, or Firm*—Conrad O. Gardner

[57] ABSTRACT

A pulse width modulated (PWM) controller for high temperature power conversion application is disclosed. The controller includes following functional blocks. A bias generator (10) establishes a stable operating point with Zero-Temperature-Coefficient (ZTC) over operating temperatures and supply voltage variations. An oscillator (13) using the same bias resistor for the bias generator (10), produces a precision time base for the PWM operation. A temperature compensated error amplifier (20) forms a closed loop regulation of a power converter. Three voltage comparators (18,33,37) provide direct coupled current mode control, current limit protection and under voltage lock-out functions. A latch (30) engages the PWM pulses to an output select circuit (21) for user configurable single-ended or double-ended switching topology. An on shot discharge circuit (26) triggered by the under voltage lock-out comparator (37) allows for proper start-up during input voltage transient. Five voltage buffers (11,12,16,35,36) with fixed gain setting provide temperature stabilized voltage thresholds for the oscillator (13) and the comparator (18,33,37). Soft start is accomplished by controlling the inverting input of the current limit comparator (33) in a timely fashion, in conjunction with the one shot discharge circuit (26). In addition, two balanced delay circuit blocks (40,41) eliminate cross-conduction current over operating temperatures in two corresponding output drivers (42,43). All of the disclosed functions are preferably incorporated into an integrated circuit whose fabrication process is suitable for high temperature applications.

29 Claims, 7 Drawing Sheets

PULSE WIDTH MODULATED CONTROLLER FOR HIGH TEMPERATURE POWER CONVERSION

FIELD OF THE INVENTION

The present invention relates to a pulse width modulated (PWM) controller, and more particularly to a power supply controller for power conversion applications at high temperatures.

BACKGROUND OF THE INVENTION

Conventional airplane actuator control uses Centralized Control method. On the average, a typical flight control actuator requires a wiring bundle containing 17 to 26 wires. The wires running from the flight control actuator average 100 to 125 feet long and weigh about 600 pounds. For typical engine and propulsion control, the electronics are usually contained in centralized Actuator Control Electronics (ACE) units installed in the pressurized air-conditioned fuselage. A typical wire run from those actuators to the ACE is about 15 to 20 feet. Those wire runs are difficult to design, fabricate, install and maintain. They also require a large number of connectors installed at both ends of each airframe production break. Service studies of commercial aircraft have shown that wiring and connector problems are the most frequent cause of system maintenance action in regular service.

A different control method with the potential of revolutionizing the way airplane system design is to use Distributed Control. Distributed systems move the processing and signal conditioning functions away from the central processing unit to a number of remote terminals at the engine or sensors. This method puts electronics close to control functions where cooling is usually not available. Therefore the Distributed Control requires high temperature electronics design. As an example, the proposed U.S. High Speed Civil Transport (HSCT) requires distributed actuator controllers to operate at highest ambient temperature of 193° C. Distributed systems reduce the number of interconnects between central processors and sensors or effectors. In other words, use of high temperature electronics will reduce the weight of the long wires and their connectors.

There are other benefits using high temperature electronics for aerospace applications. Present electronics systems in commercial airplanes are located in environmentally controlled and centralized Electronics Equipment (EE) Bays and pressurized mid-bay fuselage. An average EE Bay cooling system may weigh 400 pound and consumes 6 KVA electrical power. It is highly desirable to eliminate, reduce or simplify the cooling requirement of the electronics boxes in the aircraft EE Bay if electronics circuit can operate with minimum active cooling, or even without such cooling at all.

In addition to aerospace applications, there are other potential commercial applications in the automobile and petroleum industries where high temperature electronics are required for engine monitoring and control, emission and exhaust control as well as data logging from geothermal instrument. High-density commercial power suppliers will also be in demand since they occupy small space and will not require heat sinking.

However, the design of high temperature electronics encounters many technical difficulties. Most silicon semiconductor integrated circuits and discrete devices are subject to their maximum junction temperature limit of 150° C. Operating beyond this junction limit will cause a substantial amount of leakage in the junctions and substrate.

As operating temperature increases, circuit performance degrades rapidly. Digital parts develop additional threshold shift and more propagation delay. At high temperatures, noise margins for logic levels are reduced and flips-flops may no longer function due to additional timing violation. Analog parts, on the other hand, suffer much worse than digital counterparts at high temperatures. Excessive leakage, shift and variations of device parameters cause precision analog circuits to malfunction with devastating results.

Thanks to the Dielectric-Isolated (DI) and Silicon-On-Insulator (SOI) IC fabrication processes, originally developed for radiation hardened IC applications. The substrate current is virtually eliminated. In addition, fully depleted SOI CMOS devices have several times lower variation of the threshold voltage with operating temperatures than bulk devices. With recent modification in processing steps, SOI has become a promising technology for high temperature IC applications. As an example, the Honeywell Company has developed a precision SOI CMOS voltage reference IC, the HTREF-05.

Due to thermal limitations of the device packages, most semiconductor devices and IC's have manufacturer-specified safe operating areas and junction temperature limits that cannot be exceeded. To maintain reliable operations at high temperatures, special processing and packaging techniques such as using refractory metals and gold metallization, widening metal traces, and applying eutectic or soldering die attachment are frequently used.

Electronics circuits will not function without a properly conditioned power. High temperature power supply therefore becomes an essential part of the system. Perhaps the most challenging task is to design a high temperature switching power supply for better efficiency than a linear regulator.

At the present time, there are a handful of discrete semiconductor devices and electronics components which could operate above the 150° C. temperature limit, if special processing materials and packaging techniques are used. Although it is technically difficult, with compromised circuit performance, one could still design and package an all-discrete PWM switching power supply to operate beyond the 125° C. upper limit. However, discrete PWM switching power supplies, in many applications are not desirable to meet today's size, weight, and efficiency requirements.

The current industry standard PWM power supply controllers are not capable of operating at extreme temperatures. There are several PWM controllers that have been screened and tested at factories to meet the military temperature range of −55° C. to +125° C. However, PWM controllers operated beyond the standard military temperature ranges have not been reported anywhere. In other words, a PWM controller that operates beyond the +125 degree C in an integrated circuit form is practically nonexistent.

The present invention is directed to provide a detailed description of a power supply PWM controller that can be fabricated using the latest SOI or DI integrated circuit technology. This invention provides a method of design of a PWM controller for operation up to +225° C. temperature environment. Both analyses and hardware prototypes have proved its concept and features. The PWM controller offers several unique features that are not found in the conventional PWM controller designs. It also uses fewer external components than industry standard PWM controllers do.

BRIEF SUMMARY OF THE INVENTION

In accordance with this invention, a power supply PWM controller is essentially a mixed analog and digital integrated circuit. The present invention has a BIAS GENERATOR, an OSCILLATOR, an ERROR AMPLIFIER, three VOLTAGE COMPARATORS, a LATCH, an OUTPUT SELECT circuit, an ONE SHOT DISCHARGE circuit, an on-chip timing capacitor, two current sources, five VOLTAGE BUFFERS with fixed gain settings, two BALANCED DELAY blocks and two OUTPUT DRIVERS.

The BIAS GENERATOR establishes a stable operating point for the controller. The ERROR AMPLIFIER forms a closed loop to regulate the output voltage of a power supply to follow an external voltage reference. One Under Voltage lockout COMPARATOR determines the proper moment for a start up during the rise of an input supply voltage. A Current Limit COMPARTOR shuts off the controller if the power supply is in an over current condition. The last COMPARATOR is a Current Mode comparator that terminates the pulse width modulated drive pulses when switching current reaches to a predetermined threshold level.

An OSCILLATOR establishes a time base for the PWM operation. Its pulse engages a LATCH that sends PWM pulses to an OUTPUT SELECT block. Each PWM pulse is terminated by the output of either the Current Mode COMPARATOR or the current limit COMPARATOR. The PWM pulses are finally directed to BALANCED DELAY and OUTPUT DRIVER circuits.

With conventionally known prior art, all flip-flops and logic gates are well known circuit blocks for standard IC design. With the DI or SOI process, those digital circuits will function satisfactorily at high temperatures, if one pays attention to the timing and signal delay. Analog circuitry however is quite different. Proper functions of ERROR AMPLIFIER, COMPARATORS, OSCILLATOR and Under-Voltage lockout block will depend on circuit bias and operating point. The PWM controller employs a unique BIAS GENERATOR that depends on the principle of the Zero-Temperature-Coefficient (ZTC). The ZTC Bias Generator provides necessary operating conditions to all analog circuitry to enhance the PWM controller's performance. In addition, BALANCED DELAY and OUTPUT DRIVE blocks ensure the safe operation of the output stages at high temperatures and high switching frequencies. The OUTPUT SELECT feature allows the user to configure for either single-ended or dual-ended switching topology. These unique blocks are of special interest and will be discussed in full detail. To further validate the controller concept, analyses results are also included.

The foregoing aspects and many of the advantages of this invention will become readily appreciated, as the same become well understood by reference to the following detailed descriptions.

DETAILED DESCRIPTION OF THE INVENTION

Modem switching power supplies of high output power levels (>100 Watts) may use so-called soft-switching (SS), zero-volts-switching (ZVC) or zero-current-switching (ZCS) techniques to reduce their switching losses. However, most distributed controls demand low profile, light weight and small size, one common requirement is to keep the power consumption of the system at its lowest level, under 10 Watts if possible. This low power requirement indeed eases high temperatures power supply design since switching loss of the power switch is insignificant, in comparison to high ambient temperatures. For this very reason, the PWM power supply controller described herein has been designed to meet low power system requirement without the need of those SS, ZVS or ZCS features.

Figure 1:
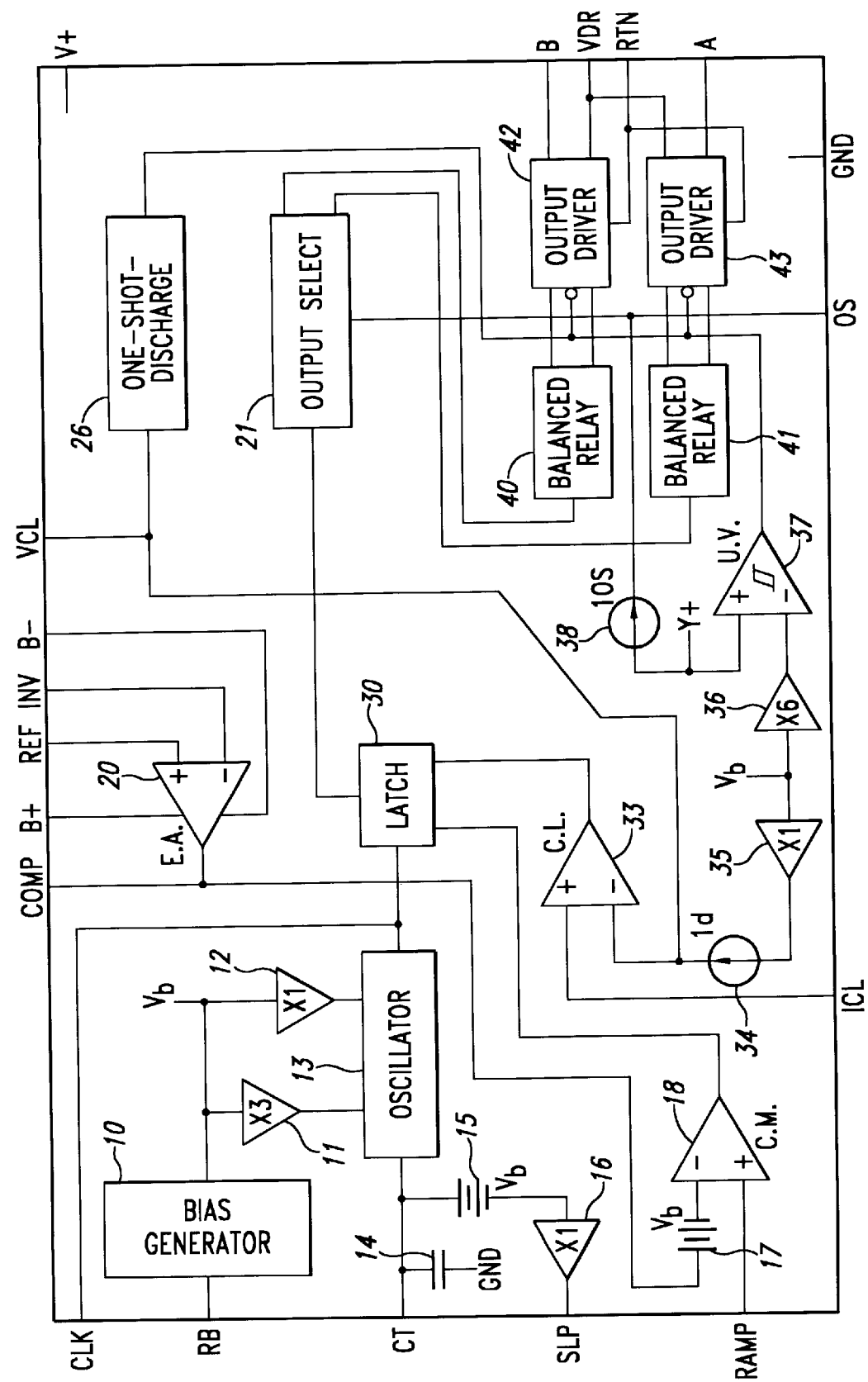
FIG. 1. Block diagram of the high temperature PWM power supply controller.
Figure 2:
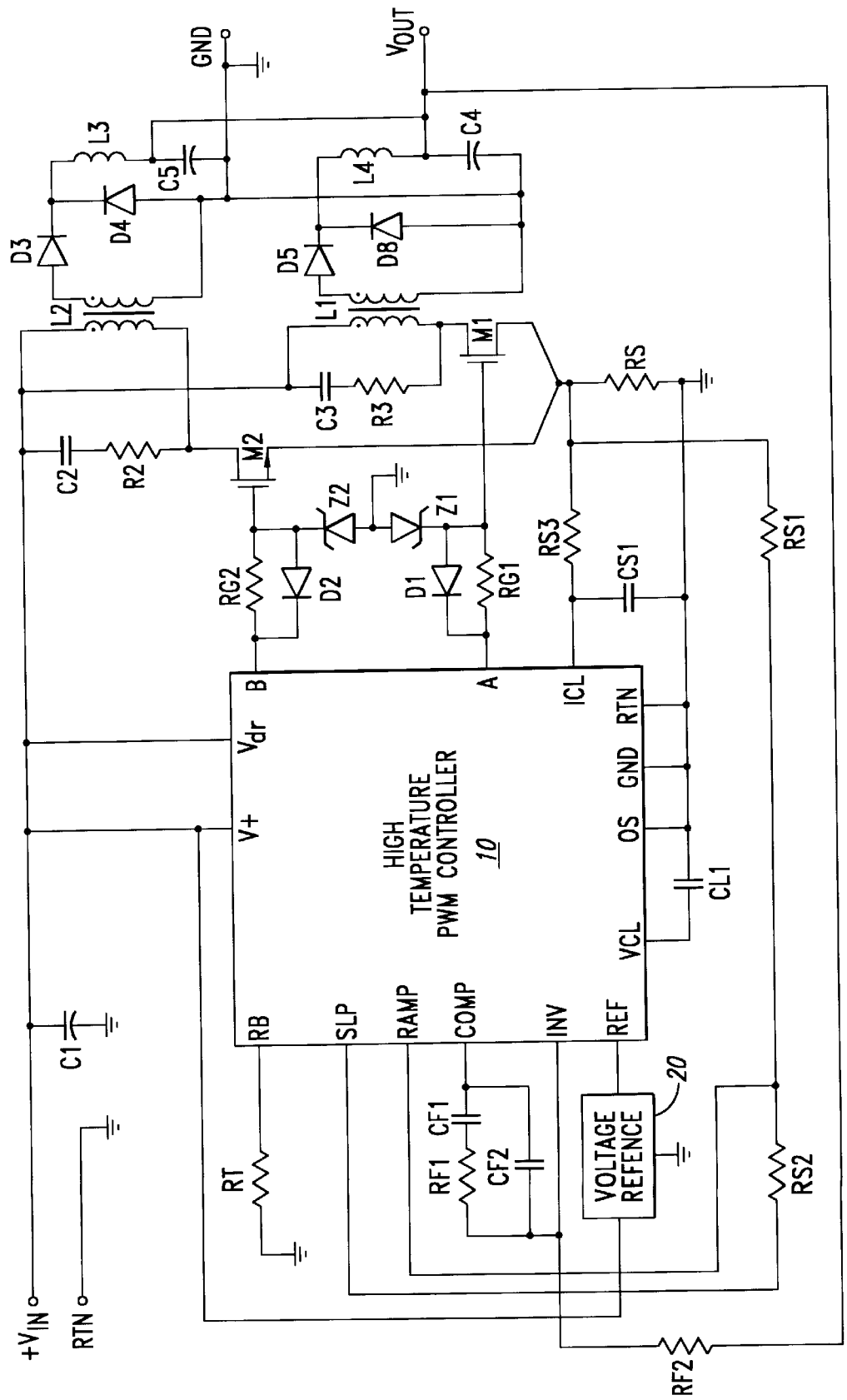
FIG. 2. A typical double-ended switching power supply.

FIG. 1 is a block diagram of the high temperature PWM power supply controller in accordance with this invention. A popular Current-Mode controlled double-ended topology using this PWM controller is simplified in FIG. 2. To better illustrate the present invention, both FIG. 1 and FIG. 2 are used together to explain the details of the PWM controller.

The PWM controller in FIG. 1 includes an Under-Voltage lockout circuit containing a COMPARATOR (U.V.) 37 that keeps the PWM output drivers disabled until the supply voltage V+ to the controller exceeds the Under-Voltage lockout threshold, typically about 7 volts. This step ensures that the control logic functions properly and there are sufficient drive energy available for the external power transistors M1 and M2 of FIG. 2. To eliminate output glitches from power transient on the supply voltage, the Under-Voltage lockout has a hysteresis range that is set at about 1 volt. After a power up, the controller starts to deliver pulse trains to power MOSFET M1 and M2 in an alternating fashion. Transformers L1 and L2 then start to deliver energy to the power supply output in an interleaved fashion. The PWM controller 10 then compares the output voltage VOUT to a precision VOLTAGE REFERENCE 20, and adjusts its duty cycles of the pulses to maintain VOUT voltage in regulation.

Maintaining voltage regulation in a power supply depends on a precision voltage reference with tighter tolerance and minimum drift. The voltage reference 20 can be a SOI integrated circuit such as the HTREF05 that is external to the PWM controller. For the PWM controller itself to work properly, a temperature and voltage independent on-chip BIAS GENERATOR becomes essential for the analog circuitry, such as the bias of the Error Amplifier 20, threshold for comparators 18, 33 and 37, voltage and current sources 11, 12, 13, 15, 16, 34, 35, 36 and 38, for the timing and compensation circuits.

The BIAS GENERATOR 10 (BIAS GEN) of FIG. 1 does not need to be a precise one like the HTREF05, but it must fully function prior to stabilization of both the PWM controller and the external reference HTREF05 after power is applied. The design of the circuit can be based on the principle of the zero-temperature-coefficient (ZTC). The ZTC bias point can be derived through device characterization and validated by analyses.

For a given MOS transistor, two distinct ZTC operating points exist in both saturation and linear regions. It is necessary to bias the MOS transistors in their saturation region rather than the linear region. If the CMOS transistor is biased at its ZTC point, variation of its drain current and corresponding threshold can be kept at its minimum level over temperatures.

Figure 3:
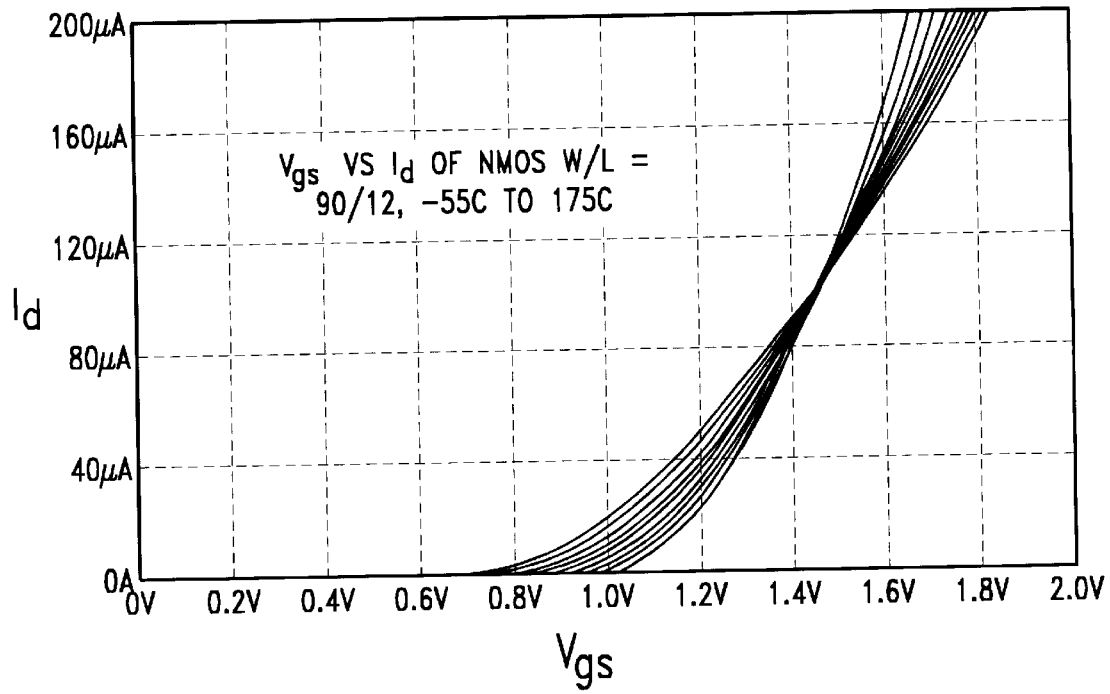
FIG. 3. ZTC bias point of a NMOS transistor.

FIG. 3 shows a typical drain current vs. gate-source voltage of a NMOS transistor operating in its saturation region over temperatures. Given a SOI CMOS process and aspect ratio (device width over length) of a NMOS transistor, a ZTC point can be derived where drain current and gate-source voltage appear to be constant with respect to operating temperatures (1.45 V and 100 uA in FIG. 3 example). Similar principles apply to a PMOS transistor as well.

Figure 4:
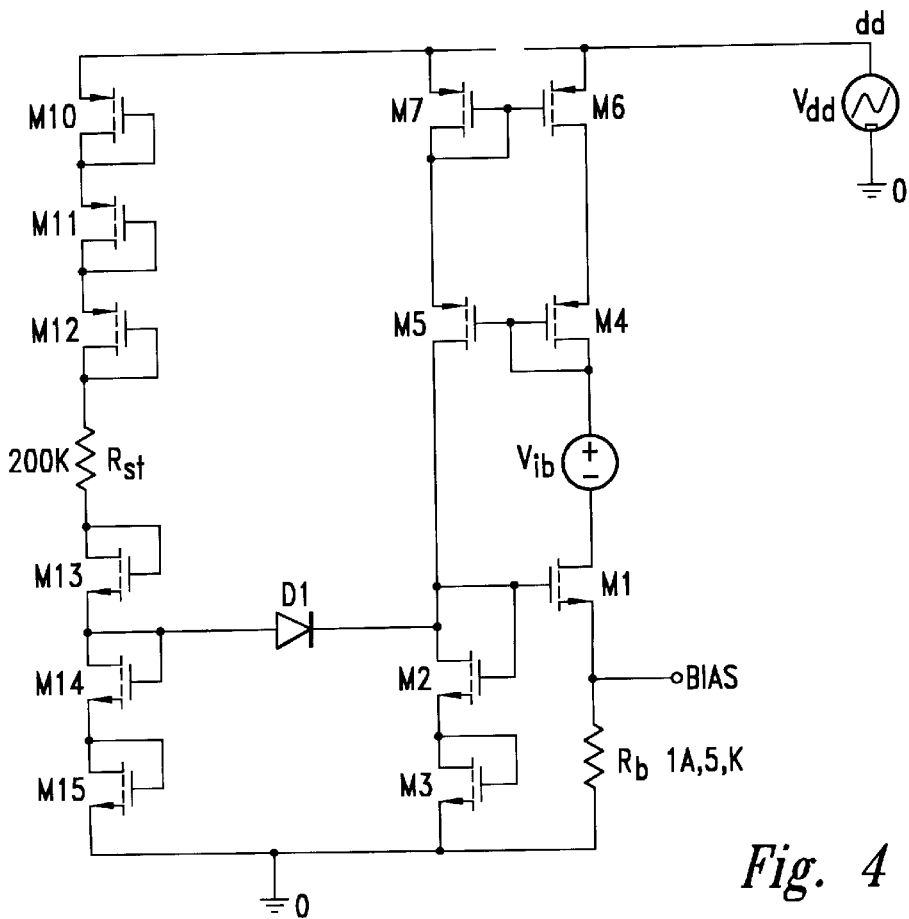
FIG. 4. Detailed embodiment, schematic of a ZTC bias generator.

By designing a BIAS GENERATOR around one-Vgs bias near the ZTC point as seen in FIG. 4, a near constant voltage source and a current source can be developed. According to one embodiment of the present invention as seen in the FIG. 4 schematic, M10, M11, M12, M13, M14 and M15 and resistor Rst set a start-up current of about several micro amps. The voltage of two-Vgs established across M14 and M15 will forward bias the diode D1 and place one-Vgs voltage on resistor Rb during the start-up. The current in M1 is mirrored back through M4, M5, M6 and M7 to bias M2 and M3. Its magnitude is simply $$Ib = \frac{Vgs}{Rb}$$

Figure 5:
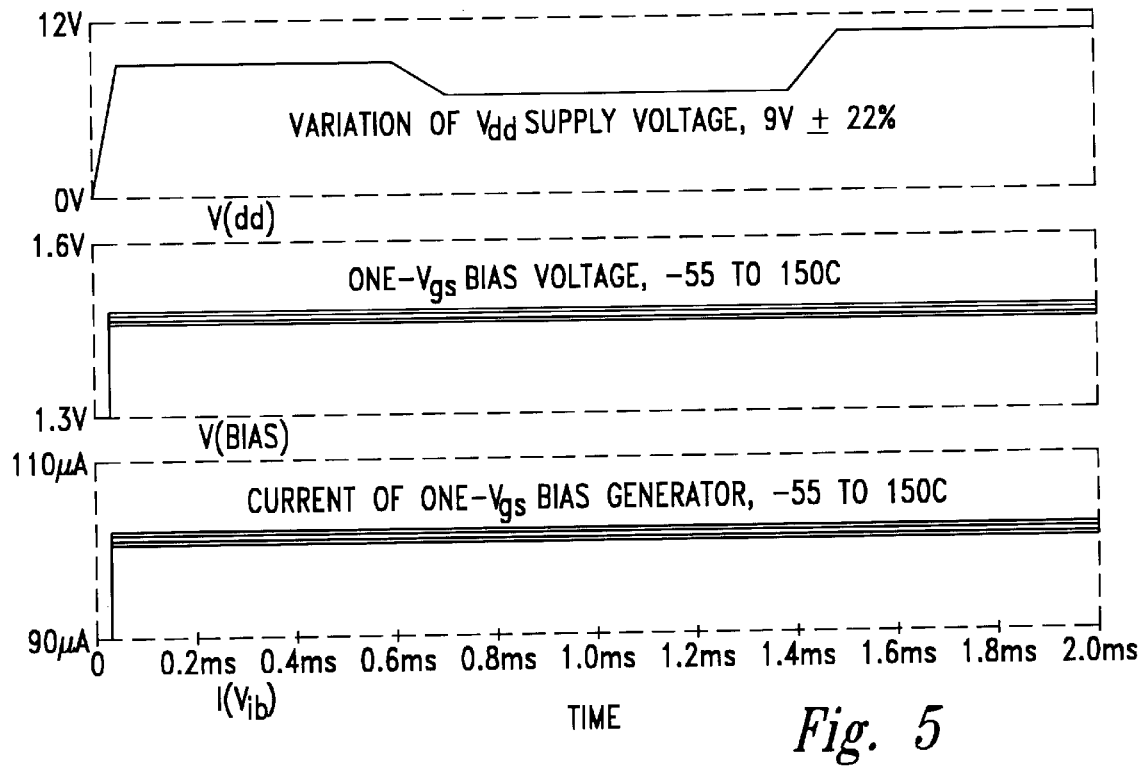
FIG. 5. ZTC biased current and voltage VS. Changes in temperatures and supply voltages.

The current flowing in Rb is about 100 uA at the ZTC operating point as derived from FIG. 3, which is much higher than the initial start-up current through M14 and M15. The voltage at the M1 gate will be higher than the voltage at the gate of M14 after the start-up. Diode D1 is reverse biased and the Bias Generator is now self biased and remains at the 100 uA current level. As seen from the simulation result in FIG. 5, current (lower plot) and voltage (middle plot) of the ZTC Bias Generator change slightly over temperatures while the supply voltage (top plot) ramps up then fluctuates within its allowed tolerance. Analyses results form FIG. 5 indicate such a ZTC bias circuit is essentially both temperature and supply independent.

Both PMOS or NMOS current mirrors with relatively constant magnitude can now be derived and scaled properly from this BIAS GENERATOR.

An external precision resistor RT of FIG. 2 with value equals to the Rb of FIG. 4 sets the PWM controller bias current around the ZTC point. If necessary, a resistor with known temperature coefficient can be used as RT to alter the ZTC bias operating point for further temperature compensation.

Most PWM controllers contain oscillators whose frequency can be externally set by a resistor and a capacitor. The OSCILLATOR 13 of FIG. 1 can be made of an odd number of inverters in a ring configuration, or a relaxation ramp generator with fixed thresholds. Reducing external discrete parts count of a high temperature power supply is highly desirable, especially for precision timing capacitors. This PWM controller uses an on-chip CMOS capacitor 14, thus only one external resistor RT is required to set the frequency of oscillation. An external timing capacitor can still be connected to the CT pad of FIG. 1 if it is necessary for further lowering the OSCILLATOR'S frequency.

As mentioned earlier in the BIAS GENERATOR 10, the same timing resistor RT of the OSCILLATOR 13 also establishes the bias current of the BIAS GENERATOR circuit. The signal on the CT pad is a saw-tooth waveform. It ramps up to three −Vb (peak) level and down to one −Vb (valley) level. The peak and valley voltages are established by BUFFERS 11 and 12 respectively, and Vb is the output voltage of that BIAS GENERATOR 10. The rising slope of the ramp signal corresponds to logic high of the OUTPUT DRIVE pulse.

Close loop voltage regulation of a power supply requires an ERROR AMPLIFIER (E.A.) 20 of FIG. 1. The amplifier is frequency compensated through a feedback network that consists of RF1, RF2, CF1 and CF2 of FIG. 2. The output of the ERROR AMPLIFIER 20 is level shifted downwards by voltage (Vb) 17 that is equal to the output of the BIAS GENERATOR 10. The voltage on the on-chip timing capacitor 14 is also shifted downwards by the same amount through BUFFER 16. The waveforms on pad SLP duplicates the saw-tooth signal on pad CT but is level shifted down by a voltage (Vb) 15. This shifted saw-tooth signal is connected to the pad RAMP through an external resistor network formed by RS1 and RS2. This results in a signal superposition of the saw-tooth waveform and the voltage signals sampled across resistor RS. The superpositioned signal that appears at the RAMP pad is being compared with the down shifted output of the ERROR AMPLIFIER 20 by a Current Mode comparator (C.M) 18. There are two reasons for down shifting both the saw-tooth waveform and the output of the ERROR AMPLIFIER. The input voltage to the COMPARATOR 18 prefers a close match to the voltage sampled across the resistor RS that is near the ground level. For the ERROR AMPLIFIER, its output prefers to stay away from the ground level over all operating temperatures.

An ERROR AMPLIFIER 20 of FIG. 1 may be a standard voltage amplifier, or a standard Output Transconductance Amplifier (OTA). The input stage is designed to sense signals near the ground level. The amplifier should be designed and laid out to minimize the total offset reflected to the input terminals. As an option, initial offset can also be trimmed externally between pads B+ and B−, if required. The amplifier is unity gain stable with a typical bandwidth of not less than 5 MHz and 70° phase margin.

Amplifier parameters are sensitive to operating temperatures. Proposed methods of temperature compensation for the amplifier are described in the following paragraphs.

For an amplifier whose voltage gain must be kept relatively constant over operating temperatures, the opamp bias current Id must vary with temperatures to cancel the changes of device mobility $\mu$. In fact, for a given device, drain current and transconductance cannot be simultaneously made temperature insensitive.

For a typical SOI CMOS process, the temperature dependent device mobility is given by:

$$\mu(T) = \mu_0 \left(\frac{T}{T_0}\right)^{-1.5}$$

where $\mu_0$ is the device mobility at $T_0$ of 273° K. The gain of a given amplifier stage is $$a_v = kv \cdot \sqrt{\frac{\mu}{Id}}$$

where kv is assumed to be a constant based on parameters of the device geometry and Early voltages, and Id is the biased device drain current. Assuming the Early voltage stays relatively constant, temperature independent gain can be derived if bias current of the gain stage is altered to compensate the changes of the device mobility:

$$I_b(T) = I_{b0}\left(\frac{T}{T_0}\right)^{-1.5}$$

where $I_{b0}$ is the bias current at $T_0$ of 273° K., then the voltage gain of the stage does not vary with operating temperatures:

$$a_v = kv \cdot \sqrt{\frac{\mu_0}{I_{b0}}}$$

One must keep in mind though that reducing bias current for gain compensation will degrade frequency response and slew rate of the circuit at high temperatures. The amplifier must be able to function at those reduced bias levels.

In other applications, constant transconductance may be more desirable than constant voltage gain. For a gain stage whose transconductance needs to be relatively constant over operating temperatures, the bias current may be increased while operating temperature rises. Since the transconductance of a given stage is $$g_m = kg \cdot \sqrt{Id \cdot \mu}$$

where kg is a constant based on device geometry.

Temperature independent gm can be obtained if changes of the bias current compensate the changes of $\mu$ over temperatures.

$$I_b(T) = I_{b0}\left(\frac{T}{T_0}\right)^{+1.5},$$

then the transconductance of the stage does not vary with the operating temperatures:

$$g_m = kg \cdot \sqrt{I_{b0} \cdot \mu_0}$$

Figure 6:
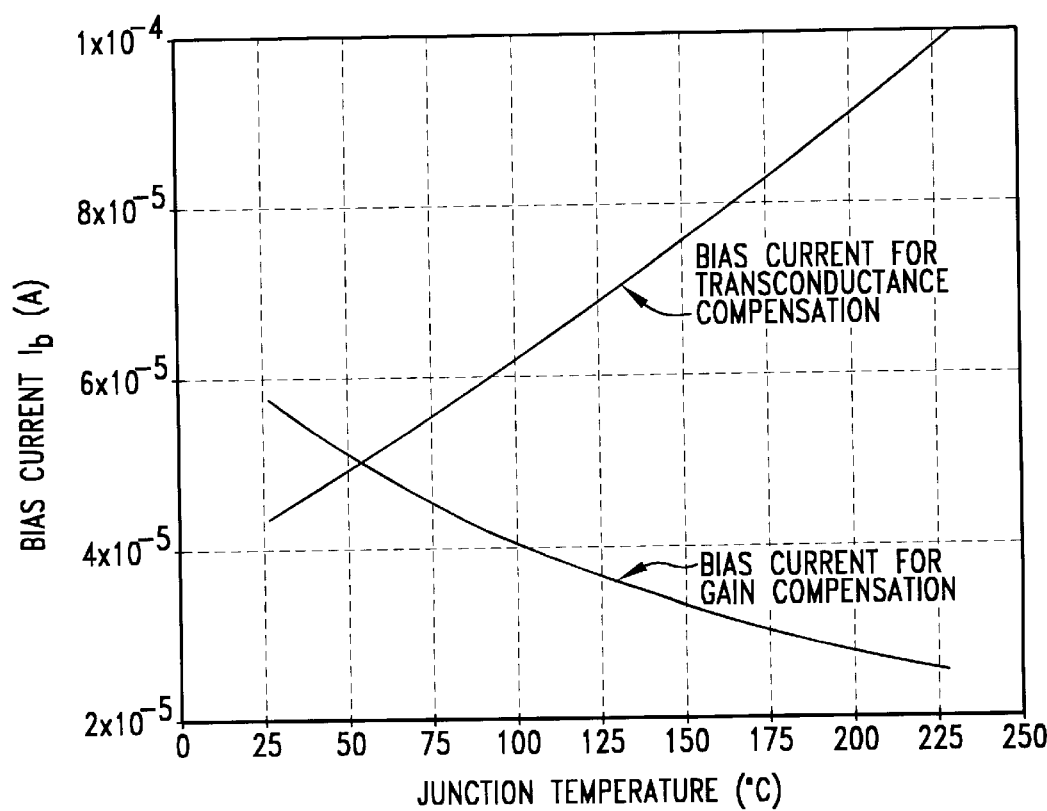
FIG. 6. Gain compensation and transconductance compensation.

For bias current $I_{b0}$ of 50 uA at junction temperature of 55° C., temperature dependent $I_b$ (T) for gain compensation and transconductance compensation are proposed in FIG. 6.

Figure 8:
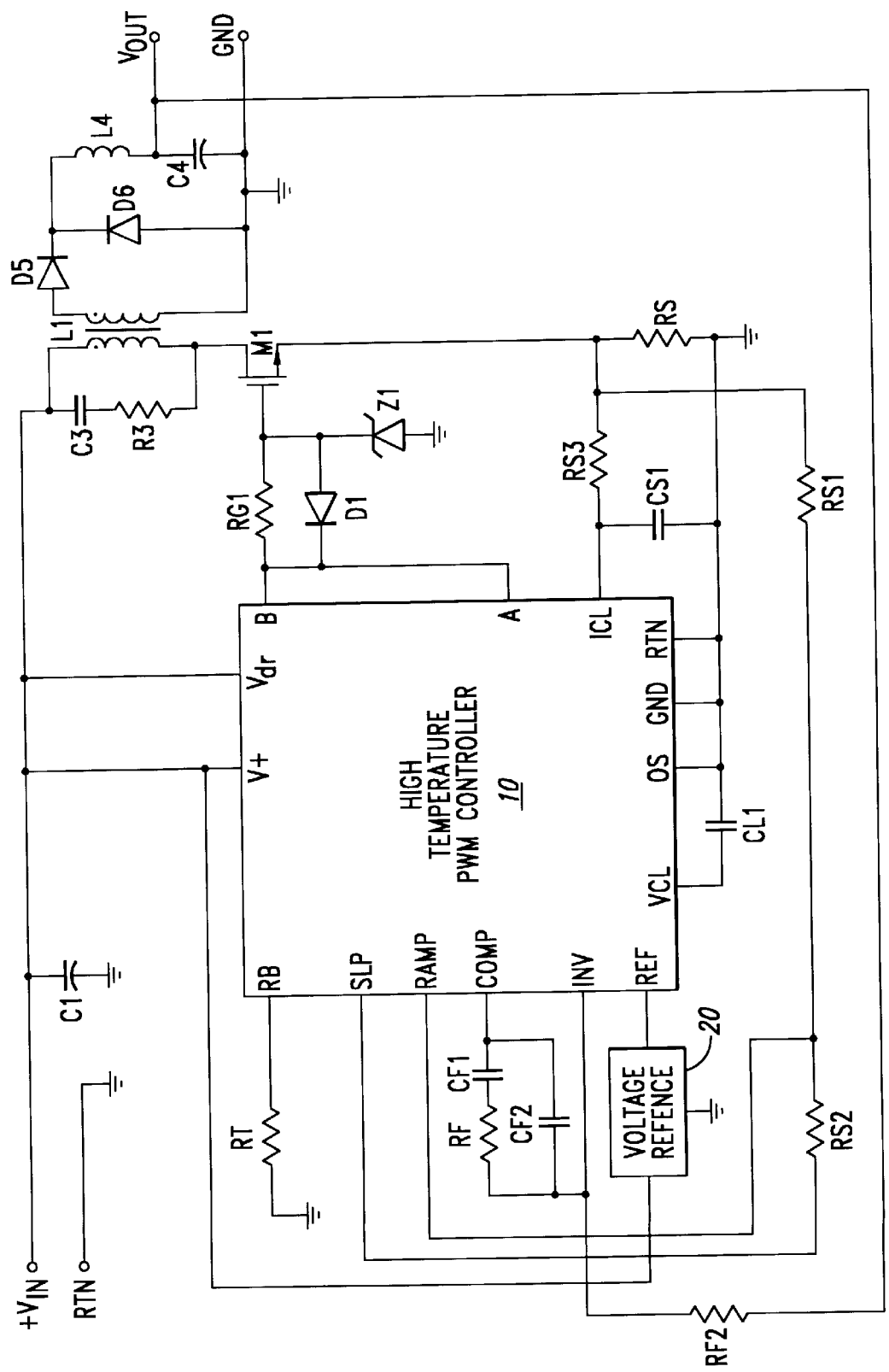
FIG. 8. A typical single-ended switching power supply.
Figure 9:
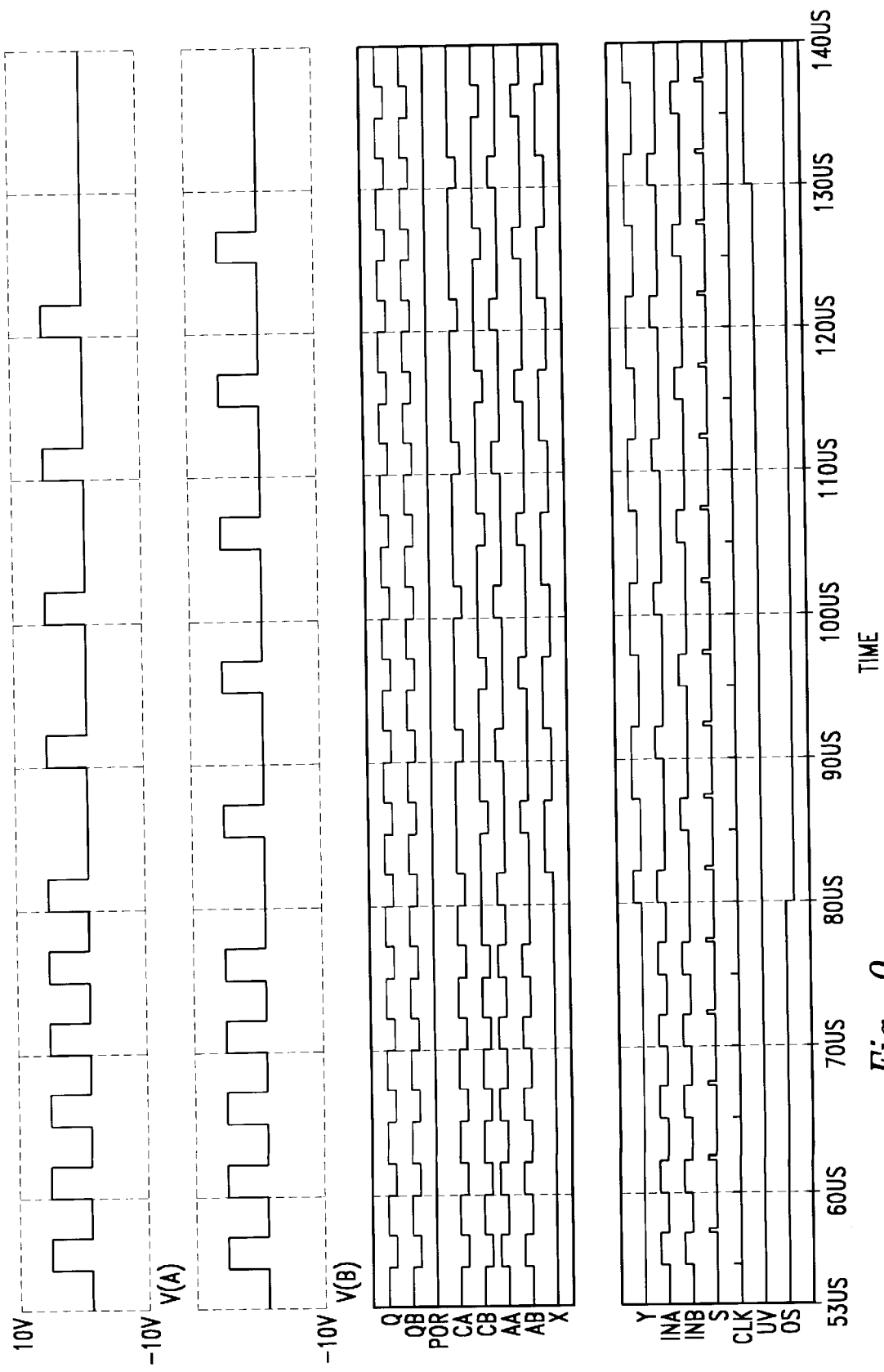
FIG. 9. Analyses of timing results of FIG. 7.

The present invention includes further embodiments. For a better understanding of the present invention, FIG. 7, FIG. 8 and FIG. 9 are provided for further explanation.

The clock signal (CLK) from the OSCILLATOR 13 of FIG. 1 is a narrow pulse train. Each pulse passes through OR gate U31 of FIG. 7 to trigger a D flip-flop U21. The D flip-flop U21 is configured as a divider whose inverted Q output feeds back to its input terminal D. In other words, NOR gates U22 and U23 alternatively receive square wave signals at half of the clock frequency.

If the OUTPUT SELECT (OS) pad is held at logic low, the out-of-phase output signals from NOR gates U22 and U23 pass through NOR gates U24 and U25, through BALANCED DELAY to the OUTPUT DRIVER A and B. If the OS pad is held at logic high, the dividing function of the D flip-flop U21 is blocked. In this case, the output of the OR gate U31 directly feeds to NOR gates U24 and U25 resulting in OUTPUT DRIVER A and B operating in same phase. The OS control and BALANCED DELAY are further discussed in the following sections.

Figure 7:
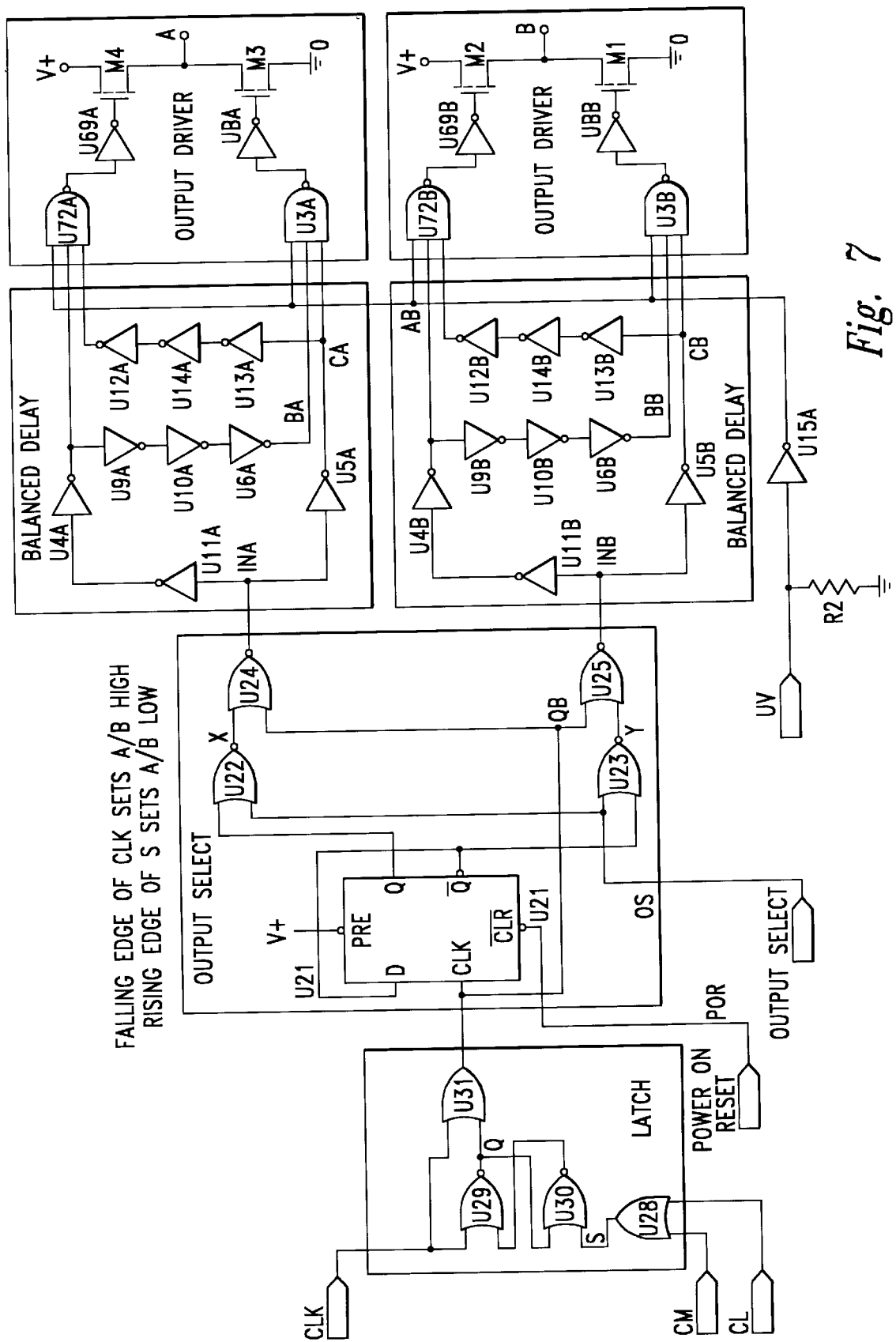
FIG. 7. Detailed embodiments, latch, output select, balanced delay and output drive.

From FIG. 7, the output stage of this PWM controller is user configurable, other than through mask changes at the factory.

By bonding the OS pad and its adjacent controller's ground pad (GND) together (see FIG. 1), the OS line is held at logic low. NOR gates U22 and U23 of FIG. 7 allow signals of opposite states from flip-flop U21 to the balanced delay circuits. Signals X and Y alternatively allow signal QB to pass U24 and U25, which finally alternates the A and B outputs. This is the dual-ended configuration for FIG. 2 application. The dual-ended output drive consists of two PWM outputs that are alternating at 180°-degree apart (out-of-phase) for push-pull, interleaving and bridge conversion topologies.

By letting the OS pad unconnected, an internal pull-up (current source 38 of FIG. 1) holds the OS line at logic high and signals from U21 are blocked. In this case, signals X and Y will be both at zero and signal QB directly arrives at the two balanced drivers. Without other circuit modifications, FIG. 2 transforms from a doubled-ended interleaving converter to a single-ended paralleled forward converter.

Since both A and B outputs are in phase if the OS pad is unconnected, with a simplification of the output drive circuit of FIG. 2, a single-ended one-switch forward converter is achieved in FIG. 8. The on-resistance of the on-chip MOS output driver transistor increases with operating temperatures. To ensure proper switching of the external power transistors at high temperatures, both A and B outputs can be tied together in parallel to reduce the driver's source impedance and deliver more drive power to the external MOSFET M1.

Traditionally, a PWM controller's output is configured by factory at mask level for either single-ended or doubled-ended topologies. The present invention offers a unique feature that allows users to configure either single-ended or double-ended converter applications, which results in cost savings in both parts procurement and design effort for all popular conversion topologies.

In FIG. 7, the falling edge of the narrow clock pulse of CLK produces logic high on the OUTPUT DRIVE A and B. The rising edge signal produced by OR gate U28 sets the output of U29 (signal Q) to logic high thus terminates pulses of the OUTPUT DRIVER A and B. The rising edge of the next CLK clock resets the signal Q to logic low. At the time a new drive cycle begins, the output of the OR gate 31 places the OUTPUT DRIVER A and B to logic high again. Implementations and their respective logic waveforms are further disclosed in later sections.

To protect the external power transistors M1 and M2 of FIG. 2 from destruction, a current limit COMPARATOR (C.L.) 33 of FIG. 1, sets the RS flip-flop 30 which in terns to place the OUTPUT DRIVER 42 and 43 at logic low under an over-current condition. An external current sense element made of a resistor RS of FIG. 2 or a current transformer provides a voltage signal, which is proportional to the load current. This voltage is being filtered through RS3, CS1 and compared against an internal current limit threshold to determine whether it exceeds an over-current limit. The internal current limit threshold is derived from a current source 34 based on the output of the BIAS GENERATOR 10.

To avoid in-rush current in the power stage of a power supply, an external capacitor CL1 of FIG. 2 is connected to the pad VCL to ground allowing a slow start during power up. The pulse width of the OUTPUT DRIVES 42 and 43 is gradually increases while the capacitor CL1 slowly charges up toward the current limit threshold Vb. If the supply voltage V+ suddenly drops out, a ONE-SHOT DISCHARGE circuit 26 will be triggered by a rising edge signal from the under-voltage lockout (U.V.) circuit 37 to discharge the capacitor CL1, thus initiating a new slow start process. The current limit comparator 33 uses an input stage similar to that of the error amplifier 20 for sensing current signal near the ground level.

A Current-Mode COMPARATOR (C.M.) 18 of FIG. 1 is essentially the same as the Current Limit COMPARATOR 33. However, it is purposely designed to be slower than the Current-Limit COMPARATOR 33, which is important to eliminate false trips by possible leading edge current spikes. Without this noise blanking, the current-mode action may take place too soon to terminate PWM pulses due to the presence of current spikes.

For standard Current Mode control in switching power supply design, the conventional scheme of ramp-slope compensation employs a number of external capacitors and resistors. To prevent extra loading on the timing capacitor which brings down the oscillator's frequency, an external buffer is often used. As a result, negative offset appears at the ramp input due to capacitors in the AC coupled signal path. The negative offset is undesirable for CMOS input. To eliminate the offset at the RAMP input and further reduce the external parts count, the present invention uses buffered ramp signal off the Oscillator 13 at the SLP pad, as shown in FIG. 1. The SLP signal is shifted down by one Vb level 15 prior to the input of the buffer stage 16. In other words, the ramp signal for slope compensation is between two Vb's and ground. Because of the on-chip BUFFER STAGE 16, the oscillator frequency is not affected by the loading of the slope compensation circuit.

The present invention uses only two external resistors RS1 and RS2, as seen in FIG. 2 to achieve slope compensation. As a result of superposition, current signals from the sense resistor RS combined with the ramp signal appear at the RAMP input in a DC coupled fashion.

As operating temperature rises, mobility of the MOS devices decreases and propagation delay increases. As a result of high frequency switching at higher operating temperatures, cross conduction current in a conventional power driver stage can develop excess amounts of heat. The internal heat generation will further reduce the device switching speed, which may eventually lead to a thermal runaway situation at high temperatures. To prevent the potential destruction of the controller's output power drive stage, an internally balanced delay must be inserted in the signal paths in order to completely eliminate cross-conduction current in the output stage over its operating temperature range. FIG. 7 shows the design details of the output stage.

The circuit of FIG. 7 contains two identical output drivers made of CMOS transistors M1, M2, M3 and M4. In order to switch external power transistors at 500 kHz frequency or higher, these output drive transistors are of relatively large size with large W/L aspect ratio (device width over length). The design uses n inverters (n equals 1,3,5 . . . odd integer numbers) here to eliminate any cross conduction current in the output MOS transistors M1–M4 during transitions on both rising and falling edges. In this circuit, U9A, U10A, U6A, U12A, U14A and U13A are inserted in the balanced signal drive paths so that the drive signals to M3 and M4 will have a predetermined non-overlap time. As the operating temperature rises, this delay will also increase which further prevents any cross-conduction current in the output power drive stages, at the cost of slightly reduced the dynamic range of the PWM control. The same principles apply to the other CMOS drive transistors M1 and M2 as well.

Maximum duty for each output of the dual-ended output drive is less than 50% duty cycle. In other words, there is always sufficient dead time between the falling edge of one drive pulse and leading edge of the other.

Because of large drive current flowing through the output stage, the Output Driver section has its own power (VDR) and ground pads (RTN).

FIG. 9 is a result of analyses of the FIG. 7 logic circuit, which indicates the operation for two different configurations on outputs A and B (two top traces), when the OS logic (bottom trace) is toggled between logic high and low. Logic wave forms of various internal circuit nodes from the Latch, Output Select, Balanced Delay are also plotted in FIG. 9 for timing references, in relation to the control input signals.

While the preferred embodiment of the invention has been illustrated and described, those skilled in the art, without departing from the sprit and scope of this invention, will further appreciate that the present invention for implementations using circuit arranged other than as described in the preferred embodiments.

The embodiments of this invention in which an exclusive property or privilege is claimed are defined as follows:

What is claimed is:

1. A pulse width modulated controller for high temperature power conversion, said controller comprising:
   (a) a bias generator of zero temperature coefficient (ZTC), having an output which remains constant regardless of changes of supply voltage and/or operating temperatures;
   (b) an oscillator having an oscillating peak and valley voltages determined by precision voltage thresholds derived from the ZTC bias generator;
   (c) amplifiers and comparators operable over a wide temperature range, having a principle of operation is based on gain compensation or transconductance compensation;
   (d) a voltage level shift that enables direct-coupled slope compensation in a current mode control scheme;
   (e) a voltage buffer stage for eliminating loading effect on a timing capacitor for slope compensation in said current mode control;
   (f) a current source based on said ZTC bias generator for both current limit protection and soft start during power up;
   (g) a user configurable output select circuit providing either single-ended or double-ended switching topology; and
   (h) a balanced delay circuit for elimination of cross-conduction current in output driver stages.

2. The pulse width modulated controller of claim 1, wherein the ZTC bias generator is based on an invariant operating point of a PMOS device or NMOS device over temperatures.

3. The pulse width modulated controller of claim 1, wherein the oscillator has an oscillating frequency determined by an external resistor and an on-chip capacitor.

4. The external resistor of claim 3 determining the oscillator frequency and further seting the bias current in said ZTC bias generator.

5. The pulse width modulated controller of claim 2, wherein the voltage of base unit from the ZTC bias generator is buffered, duplicated and scaled for various analog voltage and current applications of said controller.

6. The pulse width modulated controller of claim 1, wherein the bias techniques for constant gain and constant transconductance for operational amplifiers are compensation of mobility variation of CMOS devices over operating temperatures.

7. The principles of constant gain and constant transconductance compensation of claim 6 determining CMOS device parameters other than the device mobility.

8. The pulse width modulated controller of claim 3, wherein the levels of ramp-up and ramp-down output across the on-chip capacitor are determined by two voltage thresholds based on the temperature stable output of the said ZTC bias generator.

9. The pulse width modulated controller of claim 1, wherein the inverting input to the current mode comparator is level shift down by a voltage based on the temperature stable output of said ZTC bias generator.

10. The pulse width modulated controller of claim 1, wherein the ramp signal on the on-chip capacitor is further level shift down by a voltage determined by the temperature stable output of said ZTC bias generator.

11. The pulse width modulated controller of claim 1, wherein the inverting input to the current limit comparator is based on a current source that is also based on the same temperature stable output of said ZTC bias generator.

12. The pulse width modulated controller of claim 1, wherein the non-inverting input to the under-voltage comparator is scaled up based on the temperature stable output of said ZTC bias generator.

13. The current source of claim 11 also utilized for soft-start for the controller during power up.

14. The pulse width modulated controller of claim 1, wherein the one-shot discharge circuit discharges an external filter capacitor.

15. The pulse width modulated controller of claim 1, wherein the output select circuit determines either dual-ended or single ended switching topology by user configuration external to the integrate circuit.

16. The pulse width modulated controller of claim 1, wherein the balanced delay circuit eliminates cross conduction current in the following output drive stages over various operating temperatures.

17. The pulse width modulated controller of claim 15 utilizing an internal pull-up current source associates with the output select circuit to establish a user default operation.

18. The pulse width modulated controller of claim 15 utilizing a digital command signal applied to the output select (OS) signal line that the configuration of the controller's output is dynamically configurable.

19. The pulse width modulated controller of claim 18 enabling power converters to provide interleaved or paralleled topology for handling dynamic power loads on command.

20. The pulse width modulated controller of claim 16 utilizing equal time delays in the signal paths to eliminate overlapped turn-on during rising edge of the drive pulses.

21. The pulse width modulated controller of claim 16 utilizing equal time delays in the signal paths to eliminate overlapped turn-off during falling edge of the drive pulses.

22. The balanced delay circuit of claim 16 applies to output drive transistors of opposite types, i.e. PMOS and NMOS transistors.

23. The balanced delay circuit of claim 16 also can be modified by logic inverting and level shifting for output drive transistors of same types, i.e. all NMOS transistors.

24. The pulse width modulated controller of claim 1, wherein the resistor with known temperature coefficient is utilized as RT to alter said ZTC bias operating point for further temperature compensation.

25. Claim 1 herein further comprising:
those principles, features, improvements and claims of said pulse width modulated controller for high temperature power conversion, are immediately applicable to all pulse width modulated controllers which operate over conventional temperature ranges.

26. A pulse width modulated (PWN) controller for high temperature power conversion comprising in combination:
a bias generator (10) having a bias resistor for establishing a stable operating point having a zero temperature operating point over the operating temperature range and supply voltage variations of said pulse width modulated (PWM) controller; and
an oscillator (13) utilizing said bias resistor for producing a precision time base for operation of said pulse width modulated (PWM) controller.

27. A pulse width modulated (PWM) controller according to claim 26 further including a latch (30) for coupling pulse width modulated (PWM) pulses to an output select circuit (21) for either single-ended or double ended switching.

28. A pulse width modulated (PWM) controller according to claim 26 further including a plurality of voltage buffers (11, 12, 16, 35, 36) having fixed gain settings for providing temperature stablized voltage thresholds for said oscillator (13), and comparators (18, 33, 37).

29. A pulse width modulated (PWM) controller having two output drivers (42, 43) and two balanced delay circuits (40, 41) coupled to said output drivers (42, 43) for eliminating cross-conduction current over said operating temperature range in said output drivers (42, 43).

* * * * *